(12) United States Patent
Bailey (10) Patent No.: US 6,991,134 B2
(45) Date of Patent: Jan. 31, 2006

(54) DEVICE TO STORE, SIFT AND MEASURE FLOUR

(76) Inventor: Robert L. Bailey, 12160 Eagle Scout Ct., Cincinnati, OH (US) 45249

( * ) Notice: Subject to any disclaimer, the term of this patent is extended or adjusted under 35 U.S.C. 154(b) by 0 days.

(21) Appl. No.: 10/840,399

(22) Filed: May 7, 2004

(65) Prior Publication Data

US 2005/0247733 A1    Nov. 10, 2005

(51) Int. Cl.
   *B67D 5/58*    (2006.01)
(52) U.S. Cl. .................... 222/189.02; 222/189.06; 222/181.1; 222/185.1; 222/158; 222/305; 222/368
(58) Field of Classification Search ........ 222/305–307, 222/430, 434, 282, 444, 189.02, 189.06, 222/189.07, 185.1, 181.1, 367–368, 424.5, 222/425, 450–457
See application file for complete search history.

(56) References Cited

U.S. PATENT DOCUMENTS

| | | | | |
|---|---|---|---|---|
| 241,307 A | * | 5/1881 | Corwin | .................... 222/145.7 |
| 731,577 A | | 6/1903 | Kinnard | |
| 1,763,487 A | * | 6/1930 | Taylor | ........................ 222/217 |
| 2,061,518 A | | 11/1936 | Melish | |
| 2,259,710 A | * | 10/1941 | Stern | ........................... 222/41 |
| 2,674,375 A | | 4/1954 | Clay | |
| 2,833,445 A | * | 5/1958 | Spiers | .................... 222/189.02 |
| 3,288,287 A | * | 11/1966 | Rhodes | ....................... 209/236 |
| 3,578,209 A | * | 5/1971 | Fraser | .......................... 222/23 |
| 4,084,729 A | * | 4/1978 | Epple | .......................... 222/307 |
| 4,153,184 A | * | 5/1979 | Parish et al. | ................. 222/288 |
| 4,162,751 A | * | 7/1979 | Hetland et al. | ............. 222/293 |
| 4,448,331 A | * | 5/1984 | Millette et al. | .......... 222/185.1 |
| 4,618,075 A | | 10/1986 | Hampton | |
| 4,892,233 A | * | 1/1990 | Zelickson | .................. 222/226 |
| 5,123,572 A | * | 6/1992 | Ford | .......................... 222/135 |
| RE34,382 E | * | 9/1993 | Newnan | ..................... 222/307 |
| 5,667,109 A | * | 9/1997 | Yu-Mei | ....................... 222/456 |
| 5,833,097 A | * | 11/1998 | Ruth | .......................... 222/368 |
| 5,944,230 A | * | 8/1999 | Chiang | ........................ 222/158 |
| 2002/0139879 A1 | | 10/2002 | Fritz et al. | |

* cited by examiner

*Primary Examiner*—Frederick C. Nicolas
(74) *Attorney, Agent, or Firm*—Richard C. Litman (57) ABSTRACT

The device to store, sift and measure flour has a container that is generally rectangular in cross section, and that is relatively tall in relation to its horizontal dimensions. A sifting mechanism divides the container roughly in half vertically, and a measuring mechanism is disposed just below the sifting mechanism. Flour is stored in the upper portion of the container, and sifted and measured flour is received into the lower portion of the container, preferably into a removable drawer.

10 Claims, 7 Drawing Sheets

DEVICE TO STORE, SIFT AND MEASURE FLOUR

BACKGROUND OF THE INVENTION

1. Field of the Invention

The present invention relates to a flour storage container, and more specifically to a device to store, sift, and measure flour.

2. Description of the Related Art

In food preparation, and particularly in baking, sifted flour is an often-used ingredient. Sifting of flour helps to lighten the flour, by aerating the flour and by removing lumps. Sifted flour, however, cannot be effectively stored for a long period without the sifted flour settling, under its own weight, and re-compacting to a degree, thereby reintroducing lumps and losing the benefit of aeration of the flour. As a result, when food preparation requires sifted flour, flour must be sifted as needed and not ahead of time.

Typical flour sifters, long known to bakers and others, require that flour be removed from a storage container and placed into the sifter, and then sifted into a working container such as a bowl, and then removed from the working container for measurement, and finally placed into a mixing bowl or container for use.

U.S. Pat. No. 2,061,518, issued on Dec. 5, 1933 to T. Melish, discloses a sifter comprising a cylindrical body having a sifting screen disposed within the cylindrical body. An agitator element is disposed against the sifting screen and assists in the sifting process. Flour placed into a top portion of the cylindrical body is sifted through the sifting screen, falling freely from the bottom of the cylindrical body.

U.S. Pat. No. 2,674,375, issued on Apr. 6, 1954 to H. Clay, discloses a sifter that employs a sifting screen within a container. The bottom of the container has a discharge valve so that sifted flour is retained within the container until the discharge valve is opened. Measuring graduations are formed on the side of the container, allowing measurement of an amount of flour sifted.

U.S. Patent Publication No. 2002/0139879, published on Oct. 3, 2002, discloses a powered sifter assembly comprising a cylindrical sifter body having a sifting screen disposed within the body. A motorized agitator assembly pulverizes flour particles against the sifting screen, thereby sifting the flour. The sifted flour falls freely from the bottom of the cylindrical sifter body.

Bakers and cooks will readily recognize that the several steps required in handling flour, from removal from a storage container to finally placing sifted flour into a mixing container for use, create ample opportunity for spillage of the flour, resulting in waste of the flour and a mess to clean up. It is desirable to minimize the handling steps required to provide sifted flour for use in baking or cooking.

U.S. Pat. No. 731,577, issued on Jun. 23, 1903 to J. Kinnard, discloses a measuring caddy or cabinet for use in measuring dry merchandise, such as coffee, tea, rice, barley, and more. The cabinet includes a hopper for receiving or storing a quantity of a dry good, and a measuring device for removing a measured quantity of the dry good from the hopper. No mechanism is provided, however, for sifting a dry good, such as flour, as it is dispensed. While sifted flour conceivably could be placed into the hopper and measured, it is disadvantageous, as discussed above, to store sifted flour for a prolonged period before its use.

U.S. Pat. No. 4,618,075, issued on Oct. 21, 1986 to E. Hampton, discloses a combined storage container, sifter, and dispenser for flour. Flour, contained in the upper portion of the container, is sifted by a sifting mechanism into a lower portion of the container. For measurement of the flour, a reducer plate is placed below the sifting mechanism and one or more volumetrically sized measuring cups are attached below the reducer plate to receive sifted flour.

None of the above inventions and patents, taken either singly or in combination, is seen to describe the instant invention as claimed. Thus, a device to store, sift and measure flour solving the aforementioned problems is desired.

SUMMARY OF THE INVENTION

The device to store, sift and measure flour eases the task of providing freshly sifted flour for cooking, baking, and other tasks by reducing the amount of manual handling of the flour that is required during the sifting and measuring process. The device comprises a container that is generally rectangular in cross section, and that is relatively tall in relation to its horizontal dimensions. A sifting mechanism divides the container roughly in half vertically, and a measuring mechanism is disposed just below the sifting mechanism. Flour is stored in the upper portion of the container, and a measured volume of sifted flour is received into the lower portion of the container, preferably into a removable drawer.

A relatively large quantity of un-sifted flour may be maintained in storage in the upper portion of the container, where it is ready to be sifted, measured, and dispensed. Thus, when freshly sifted flour is needed it is not necessary to transfer a quantity of flour into a sifting device.

When a measured quantity of sifted flour is needed, the measuring assembly is set for the desired amount of flour and placed into a first position wherein the measuring assembly receives sifted flour from the sifting mechanism. The sifting mechanism is operated to sift flour contained in the upper portion of the container. Flour from the upper portion of the container is fed by gravity to the sifting mechanism, and into the measuring assembly as it is sifted.

When the measuring assembly is filled, the measuring assembly is placed into a second position wherein the sifted flour contained in the measuring assembly empties into the bottom portion of the container, where it is received by the drawer.

Freshly sifted flour is thus provided with no requirement to handle the flour while obtaining the flour from storage, sifting the flour, or measuring the sifted flour, resulting in a reduction of wasted flour and a reduction in the need to clean up spilled flour.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
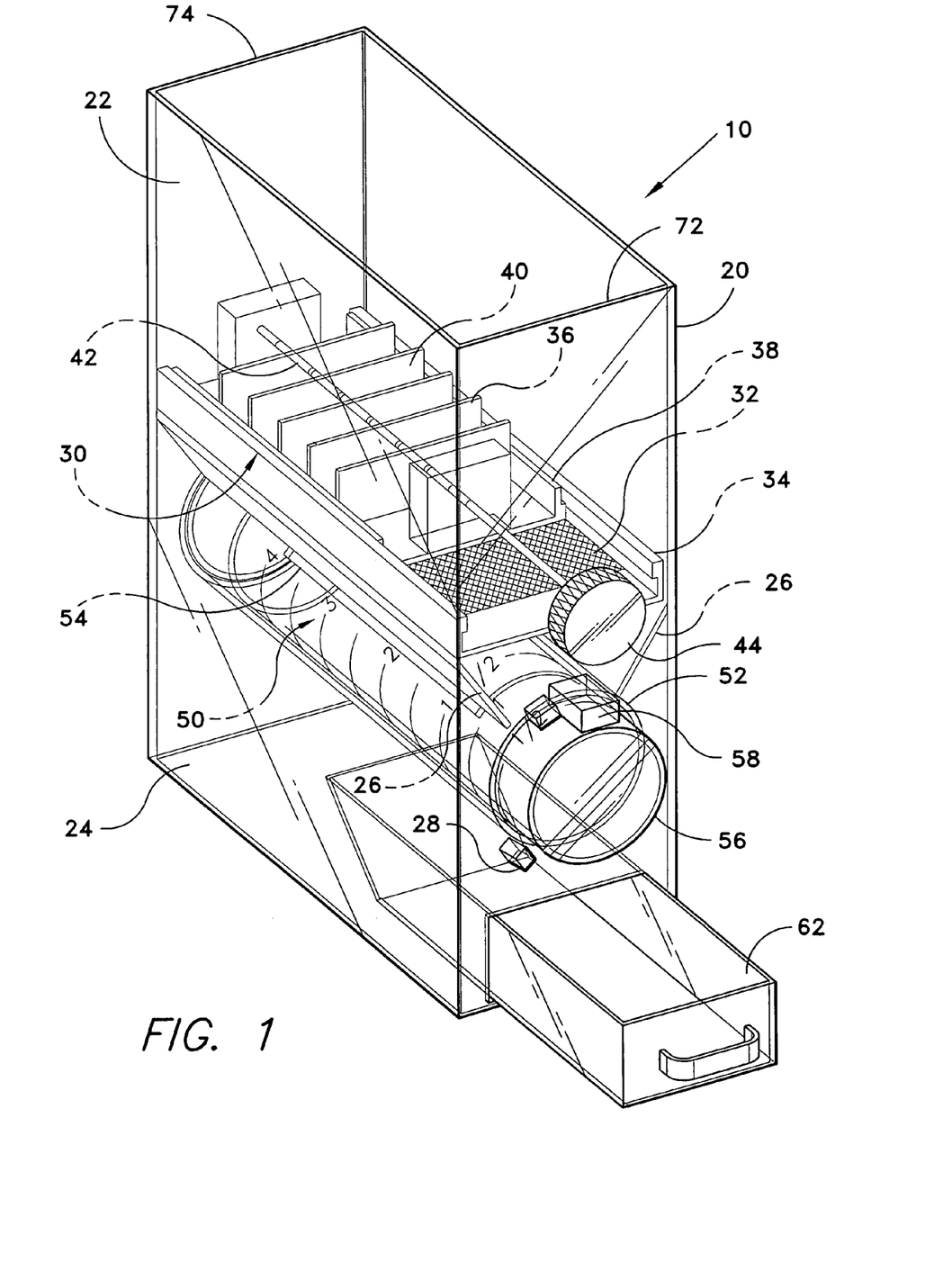
FIG. 1 is a perspective view of a device to store, sift and measure flour according to the present invention with the collection drawer pulled out and the inner measuring tube retracted.
Figure 2:
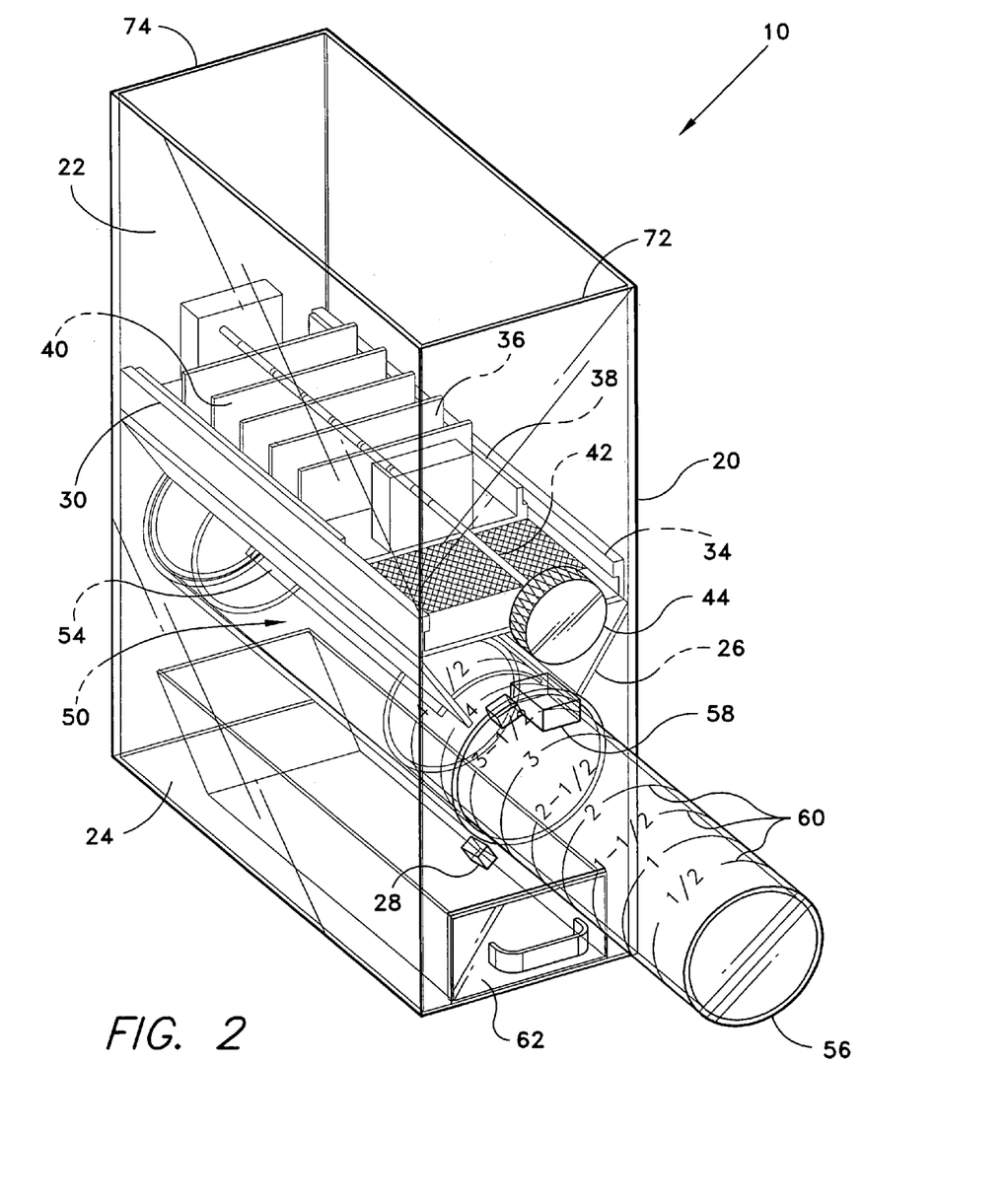
FIG. 2 is a perspective view of a device to store, sift and measure flour according to the present invention with the collection drawer pushed in and the inner measuring tube extended.

The present invention is a device to store, sift and measure flour, designated generally as 10 in the drawings. Referring to FIGS. 1 and 2, the device to store, sift and measure flour 10 comprises a container 20 having a generally rectangular horizontal cross section, the container 20 having a front wall 72, a rear wall 74, side walls and a bottom wall, the walls of the container preferably being transparent. The container 20 preferably has a removable top (not shown). The container 20 is relatively tall in relation to its horizontal dimensions. A sifting assembly 30 is disposed within the container 20. The sifting assembly 30 divides the container 20 roughly in half vertically, separating an upper portion 22 of the container 20 from a lower portion 24 of the container 20. The upper portion 22 of the container 20 has an interior volume sufficient to contain a quantity of flour in storage.

A measuring assembly 50 is located within the container 20 below the sifting assembly 30. Sloping walls 26, disposed within the container 20 between the sifting assembly 30 and the measuring assembly 50, form a chute that directs sifted flour from the sifting assembly 30 to the measuring assembly 50. The device 10 is shown in FIG. 2 with the measuring assembly 50 configured to measure about 3 ½ cups of sifted flour.

A drawer 62 or other receptacle is removably disposed within the lower portion 24 of the container 20, beneath the measuring assembly 50.

Figure 3:
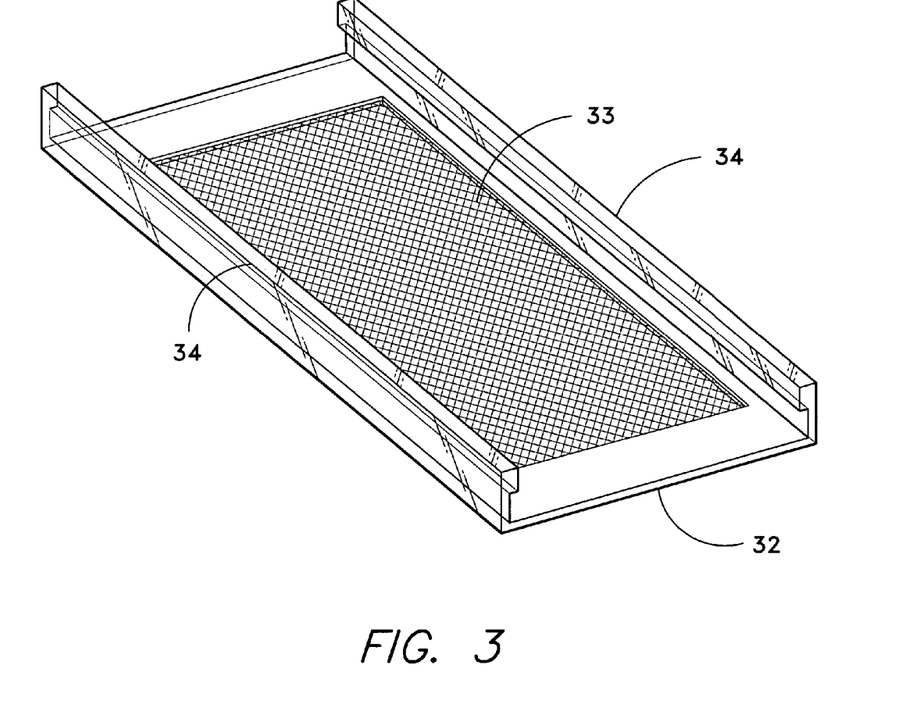
FIG. 3 is a perspective view of a sifting screen for the device to store, sift and measure flour according to the present invention.
Figure 4:
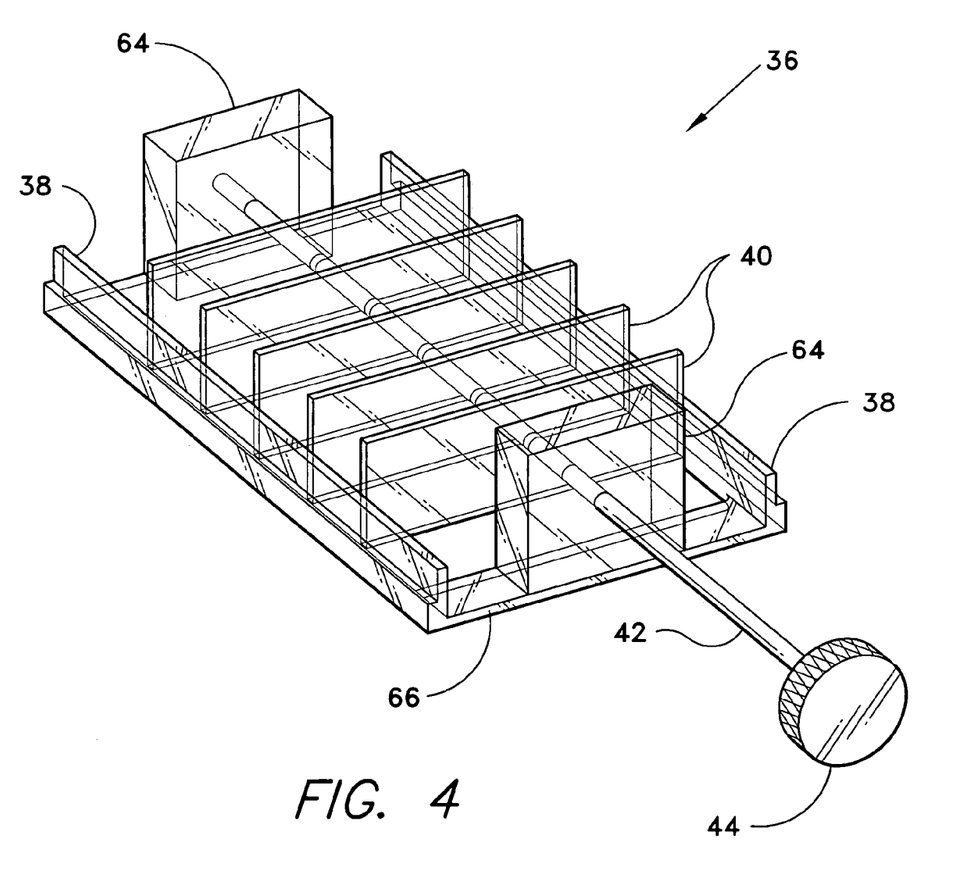
FIG. 4 is a perspective view of a rake assembly for the device to store, sift and measure flour according to the present invention.

Referring now to FIGS. 3 and 4 along with FIGS. 1 and 2, the sifting assembly 30 is comprised of a sifting screen 32 (shown in FIG. 3) and a rake assembly 36 (shown in FIG. 4). The sifting screen 32 comprises a piece of screen mesh material supported by a rigid frame. Alternatively, the sifting screen 32 may be a sheet of a rigid material, such as plastic, with many small holes or orifices formed therethrough. Guide rails 34, along side edges of the sifting screen 32, help to attach the sifting screen 32 within the container 20 and define a guide track for the rake assembly 36, allowing the rake assembly 36 to slide back and forth across the sifting screen 30 while holding the rake assembly 36 in contact with the sifting screen 30.

The rake assembly 36 comprises at least one, and preferably several, rake blades 40 mounted transversely, in a spaced apart manner, along a pushrod 42. In the present embodiment, the rake blades 40 and pushrod 42 are supported on a frame 66 that slides within the guide track defined by the sifting screen 32. A handle 44 is disposed on the end of the pushrod 42, to facilitate operation of the rake assembly. Side rails 38, along the edges of the sliding frame 66, engage with the guide rails 34 of the sifting screen 32. Mounting blocks 64 support the pushrod 42 at each end of the frame 66. An opening is defined through the sliding frame 66 between side rails 38 whereby the rake blades 40 contact the sifting screen 30 as the rake assembly 36 is moved back and forth across the sifting screen 32.

Figure 5:
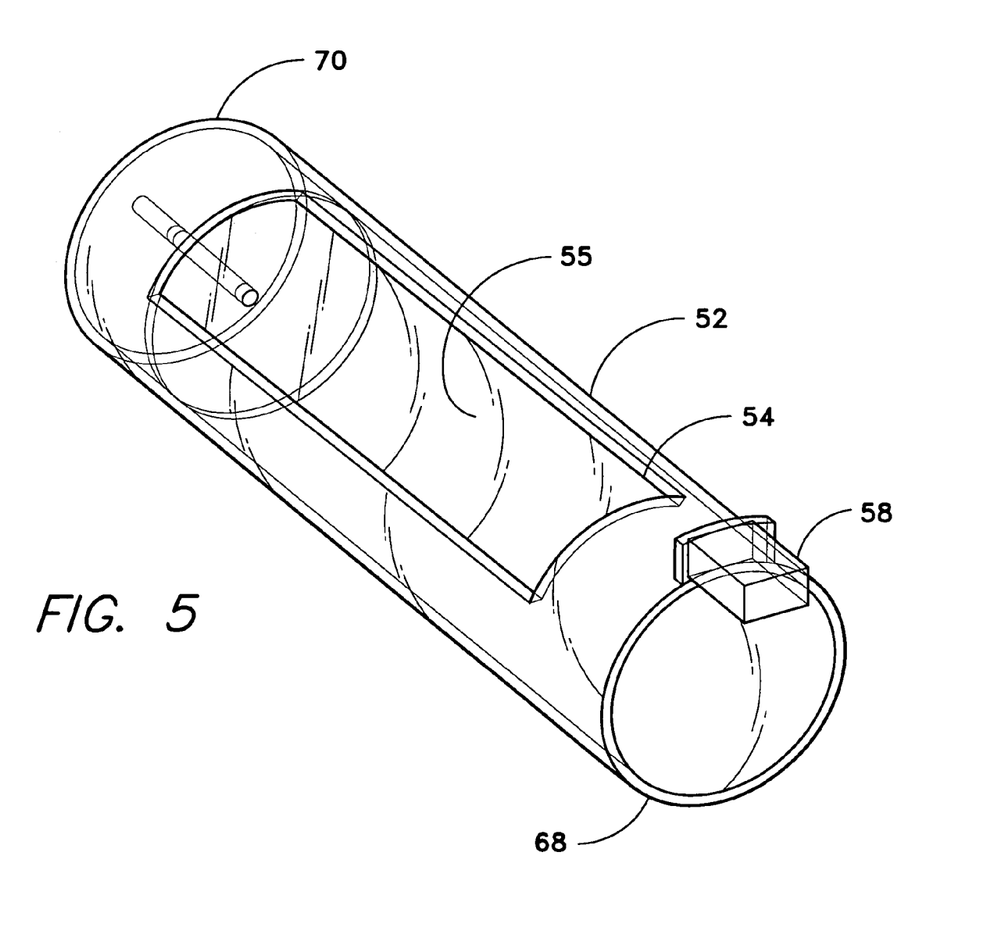
FIG. 5 is a perspective view of an outer tubular body component of a measuring assembly for a device to store, sift and measure flour according to the present invention.
Figure 6:
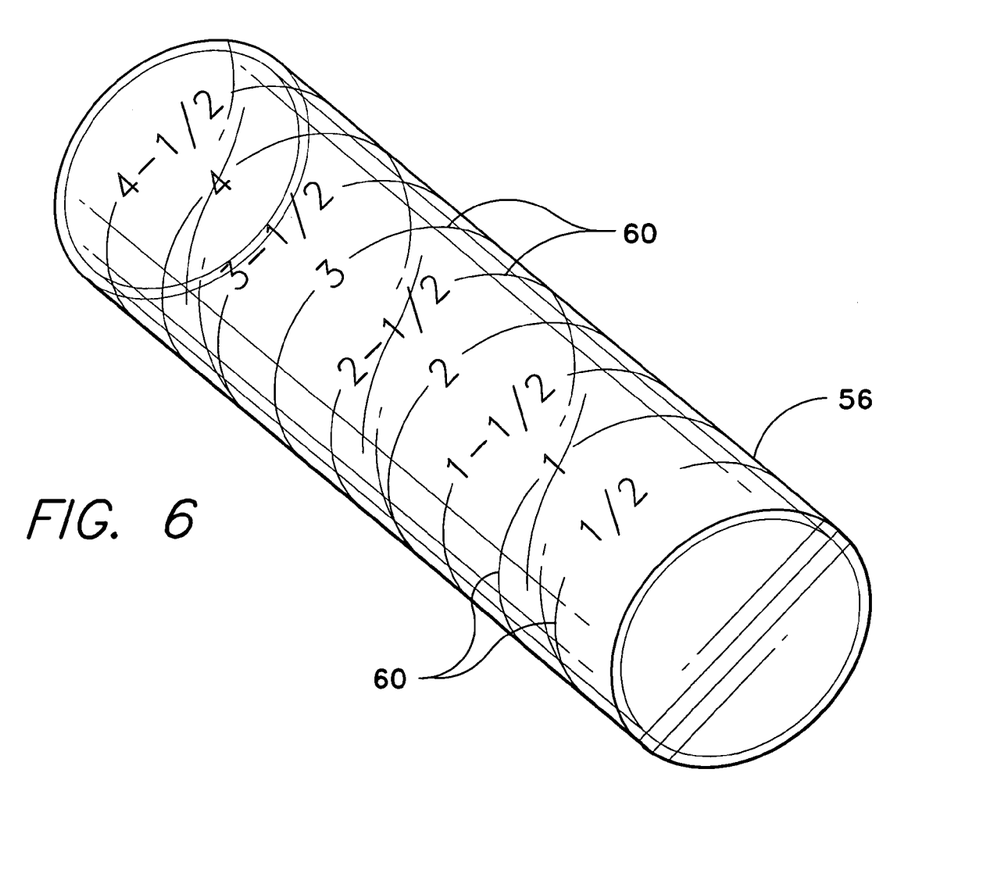
FIG. 6 is a perspective view of an inner tubular body component of a measuring assembly for a device to store, sift and measure flour according to the present invention.

Referring now to FIGS. 5 and 6 in combination with FIGS. 1 and 2, the measuring assembly 50 is comprised of an outer tubular body 52 and a concentric inner tubular body 56. The outer tubular body 52 has an open end 68 and a closed end 70, and a hollow interior 55. An elongated opening 54 is defined in the outer tubular body 52. The outer tubular body 52 is disposed horizontally within the container 20, below the sifting assembly 30, with the closed end rotatably attached to the rear wall 74 of the container 20 and the open end 68 extending through the front wall 72 of the container 20. The outer tubular body is 52 rotatable between a first position, wherein the opening 54 faces upward, in alignment with the chute formed by sloping walls 26, and a second position wherein the opening 54 faces downward. A handle 58, disposed on the open end 68 of the outer tubular body 52, facilitates manual rotation of the outer tubular body 52. Stops 28 extend inward from the front wall 72 of the container 20 adjacent to the outer tubular body 52, and limit the rotational travel of the handle 58 to define the first and second positions of the outer tubular body 52.

The inner tubular body 56 fits into the outer tubular body 52, and is slidably received by the open end 68 of the outer tubular body 52. The inner tubular body 56 fills a portion of the hollow interior 55 of the outer tubular body 52 so that flour that is sifted into the outer tubular body 52 can only fill the portion of the hollow interior 55 of the outer tubular body 52 not filled by the inner tubular body 56. As a result, the inner tubular body 56 functions to vary the amount of flour that may be contained within the outer tubular body 52, whereby the inner tubular body 56 may be positioned so that a predetermined amount or measured volume of sifted flour will be delivered. Graduated measuring indicia 60 are formed on the inner tubular body 56 and calibrated so that the measuring indicia 60 correspond, when positioned proximate to a known reference point, such as the end of the outer tubular body 52, to the volume of the open portion of the hollow interior 55 of the outer tubular body 52.

In operation, a quantity of flour is stored in the upper portion 22 of the container 20, supported on the sifting assembly 30. While some of the flour may work its way through the sifting assembly 30, the flour will generally compact against the sifting assembly 30 and not travel through the sifting assembly 30 until the sifting assembly 30 is operated to sift the flour.

Figure 7:
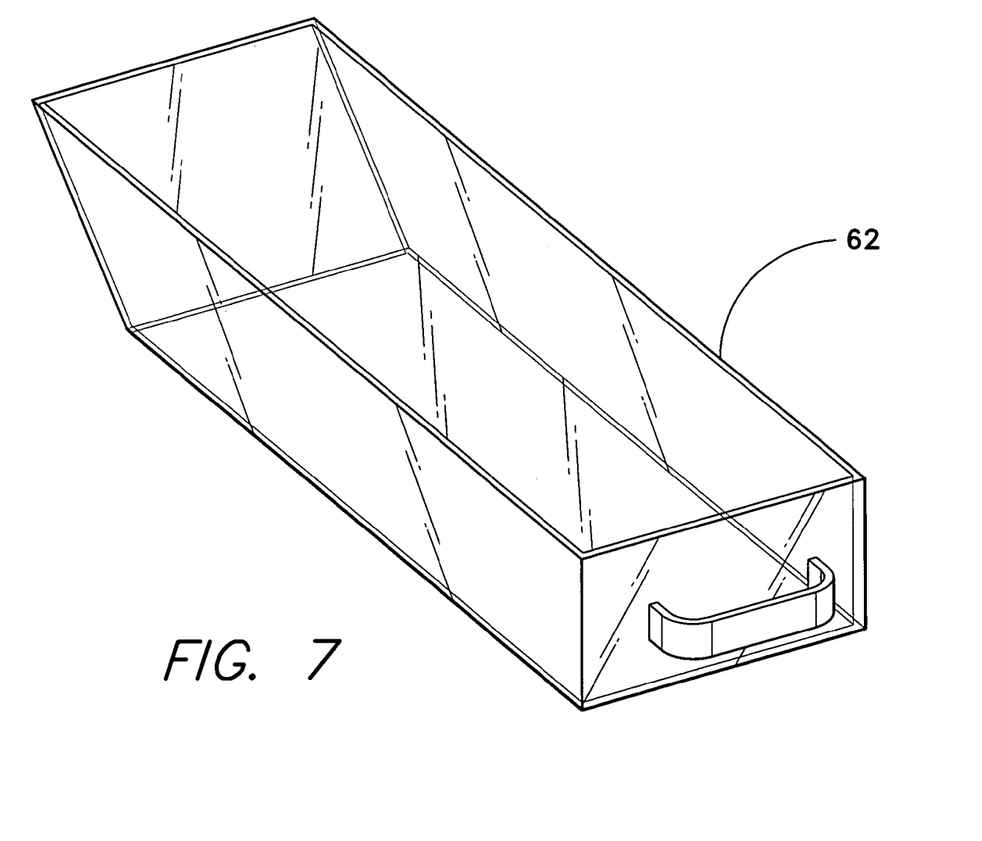
FIG. 7 is a perspective view of a drawer for receiving sifted flour in a device to store, sift and measure flour according to the present invention.

Operating the rake assembly 36 by grasping the handle 44 to move the rod 42, and thus the rake blades 40, back and forth across the sifting screen 32 causes flour to be sifted through the sifting screen 32. The inner tubular body 56 is positioned within the outer tubular body 52 for measurement of a desired amount of sifted flour. With the outer tubular body 54 rotated into its first position, flour that is sifted through the sifting assembly 30 is funneled by the sloping walls 26 through the opening 54 and into the hollow interior 55 of the outer tubular body 52. Rotating the outer tubular body 52 into its second position allows sifted flour contained within the outer tubular body 52 to be discharged into the lower portion 24 of the container 20, where the sifted flour is collected in the drawer 62, seen in more detail in FIG. 7.

Freshly sifted flour is thus provided with no requirement to handle the flour while obtaining the flour from storage, sifting the flour, or measuring the sifted flour, resulting in a reduction of wasted flour and a reduction in the need to clean up spilled flour.

It is to be understood that the present invention is not limited to the embodiment described above, but encompasses any and all embodiments within the scope of the following claims.

I claim:

1. A device to store, sift and measure flour, comprising:
   a container having a generally rectangular horizontal cross section, the container having a front and a rear wall;
   a sifting assembly disposed within said container, the sifting assembly dividing said container into an upper portion and a lower portion, wherein said sifting assembly includes a sifting screen and a rake assembly slidably disposed on said sifter screen, said sifting screen comprises:
   a frame having side edges; and
   a screen supported by said frame;
   a pair of guide rails disposed on the side edges of said frame;
   an outer tubular body having a closed end, an open end, and a hollow interior defining a volume, an elongated opening defined in the tubular body, the outer tubular body being disposed horizontally within said container below said sifting assembly and being rotatable between a first position wherein the opening faces upward and a second position wherein the opening faces downward;
   an inner tubular body concentrically and slidably disposed within the outer tubular body and having a closed end, the closed end being slidably received within said outer tubular body, the inner tubular body filling at least part of the volume defined by the hollow interior of said outer tubular body.

2. The device to store, sift and measure flour according to claim 1, wherein the open end of said outer tubular body extends through the front wall of said container.

3. The device to store, sift and measure flour according to claim 1, wherein the closed end of said outer tubular body is rotatably attached to the rear wall of said container.

4. The device to store, sift and measure flour according to claim 1, further comprising at least one sloping wall defining a chute disposed between said sifting assembly and said outer tubular body, the opening in said tubular body being in registry with said chute when said outer tubular body is in the first position.

5. The device to store, sift and measure flour according to claim 1, further comprising graduated measuring indicia disposed on said inner tubular body.

6. The device to store, sift and measure flour according to claim 5, wherein each of said markings indicates a portion of the volume of the hollow interior of said outer tubular body left void when said inner tubular body is slidably extended from said outer tubular body.

7. The device to store, sift and measure flour according to claim 1, further comprising a handle extending from the open end of said outer tubular body.

8. A device to store, sift and measure flour, comprising:
   a container having a generally rectangular horizontal cross section, the container having a front and a rear wall;
   a sifting assembly disposed within said container, the sifting assembly dividing said container into an upper portion and a lower portion, wherein said sifting assembly includes a sifting screen and a rake assembly slidably disposed on said sifter screen, wherein said rake assembly comprises:
   a rod; and
   at least one rake blade transversely disposed on said rod;
   an outer tubular body having a closed end, an open end, and a hollow interior defining a volume, an elongated opening defined in the tubular body, the outer tubular body being disposed horizontally within said container below said sifting assembly and being rotatable between a first position wherein the opening faces upward and a second position wherein the opening faces downward;
   an inner tubular body concentrically and slidably disposed within the outer tubular body and having a closed end, the closed end being slidably received within said outer tubular body, the inner tubular body filling at least part of the volume defined by the hollow interior of said outer tubular body.

9. The device to store, sift and measure flour according to claim 8, wherein said rake assembly further comprises a frame having side edges, said rod and said at least one rake blade being supported on the frame.

10. The device to store, sift and measure flour according to claim 9, further comprising a pair of side rails disposed on the side edges of said frame.

* * * * *